July 29, 1941.  J. A. ORR  2,251,023
GRASS CUTTER
Filed Jan. 19, 1940
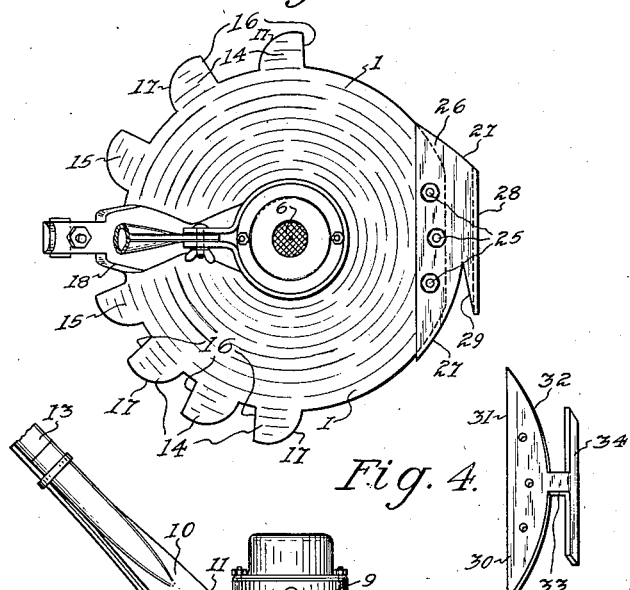
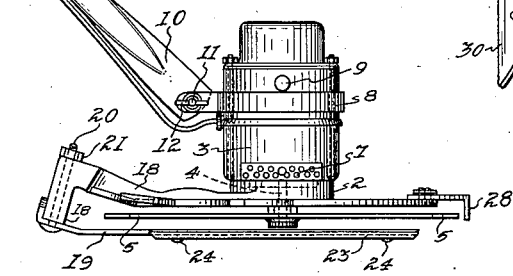
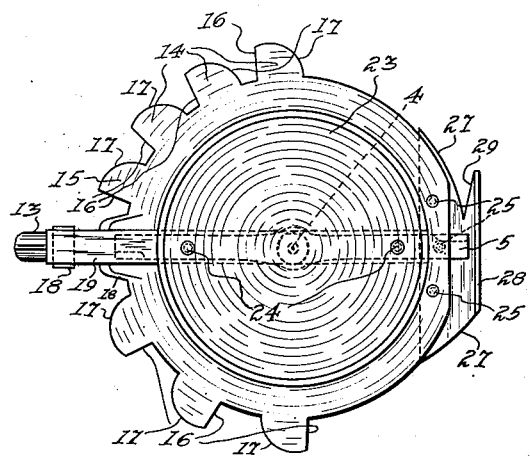
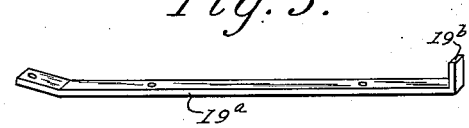
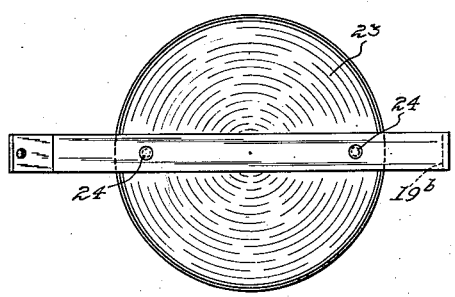
Inventor
John Alexander Orr
By H. J. Sanders
Atty.

Patented July 29, 1941

2,251,023

UNITED STATES PATENT OFFICE 2,251,023

GRASS CUTTER

John Alexander Orr, Chicago, Ill.

Application January 19, 1940, Serial No. 314,671

2 Claims. (Cl. 56—25.4)

This invention relates to improvements in grass cutters and more particularly to a light weight, readily portable grass cutter that can be moved about freely with one hand and that is particularly useful for cutting lawns, for grass cutting in parks, cemeteries and for similar purposes. The present device is along the line of my co-pending applications, Serial Nos. 181,619, and 226,714.

Among the objects of the present invention are to provide a grass cutter having few parts which are all of substantial construction, readily assembled and readily accessible for inspection, repair or replacement. A further object is to provide a grass cutter wherein a rotary knife is employed and used in combination with other parts to be fully described, permitting the device to be moved in any direction over the ground as well as along the face of tombstones in cemeteries, along curbstones and along the face of any wall or like object in such manner that the grass will be fed to the knife and cut without the possibility of contact by the knife with the object and without the possibility of injury to the operator through contact with the knife.

With the foregoing and other objects in view the invention consists in the combination and arrangement of parts to be hereinafter fully described, pointed out in the claims and illustrated in the accompanying drawing, in which—

Fig. 1 is a top plan view of the grass cutter, a portion of the handle being omitted.

Fig. 2 is a view of Fig. 1 in side elevation.

Fig. 3 is an inverted plan view of Fig. 1.

Fig. 4 is a perspective view of a modified form of guard and guide employed, shown inverted.

Fig. 5 is a perspective view of a slightly modified form of the bar shown in Figs. 2 and 3.

Fig. 6 is a plan view of the transport disc provided with the bar shown in Fig. 5.

Like reference characters denote corresponding parts throughout.

The reference numeral 1 denotes a plate which in the present instance is flat and substantially circular although not necessarily so.

The said plate is perforated centrally and there formed or provided with a vertically disposed hub 2 perforated centrally in alignment with the plate perforation, said hub receiving the lower end of the motor casing 3 containing an electric motor of conventional type and having the motor shaft 4 that extends downwardly through the hub and plate perforations and has operatively secured to its lower end portion the rotary blade 5 disposed in spaced relation to the said plate. The motor casing is provided with the screen 6 and with the perforations 7 for the purpose of ventilation.

A metal strap 8 encircles the motor casing below the oppositely disposed bosses 9, the ends of said strap receiving the flattened end of the handle holder 10 adjustably arranged upon the bolt 11 connecting said strap ends and provided with the wing nut 12 for releasably retaining said handle holder in adjusted position, said handle holder being provided with the removable handle 13, only part of which is shown.

Referring again to the plate 1 the same is provided with teeth peripherally, designated by numeral 14, and therebetween with teeth 15 somewhat widely spaced apart and bent upwardly somewhat from the plate, said teeth being located upon the same side of said plate as said handle. Each of the several teeth is formed with a straight edge portion 16 and with a rounded edge portion 17. Disposed between the teeth 15 and preferably integral with the plate is the raised rib 18 extending from the hub periphery radially of the plate, said rib from the plate periphery proper extending upwardly and outwardly beyond the circumference of a circle that might be described tangential to the teeth, said rib at a point slightly beyond said circle being bent downwardly at right angles to itself to a point slightly below the plane of the knife 5 and at its free lowermost end having secured thereto one end of the elongated preferably flat resilient bar 19, or bar 19a, by means of the bolt 20 passing therethrough and through the downturned end of the rib 18, said bolt being provided with the nut 21 for retaining it securely in position. The outermost end of the bar 19, or 19a, is pressed up into engagement with the rib 18 termination.

The said bar 19, or 19a, extends from the downturned end of the rib 18 inwardly below the knife and adjacent end of the motor shaft transversely and centrally of the plate 1 and across the top face of the transport disc 23 to which it is secured by rivets 24, said disc being preferably round although it may be of other shape, and of a diameter less than the length of the blade 5 which latter member is of a length greater than the diameter of the plate 1 without the teeth. This permits the beveled sharpened ends of the blade to extend beyond the plate 1 and transport disc 23 to cut the grass. The bar 19 extends completely across the transport disc, while the bar 19a extends thereacross and therebeyond and has its free end 19b upturned and disposed outwardly beyond the knife 5 to serve as a guard therefor against contact with objects which might otherwise damage the blade. The particular method of securing the transport disc to the plate 1, by means of the bar, provides a resilient, easy riding support for the plate and its connections and absorbs shock that might otherwise be transmitted to the knife, as well as reducing vibration that would otherwise be transmitted to the hand of the operator.

Secured to the top face of the plate 1 by rivets 25 directly opposite the rib 18 is a guard and guide 26 of flat material, such as sheet metal or the like, the inner edge of which may be straight, the end portions 27 preferably rounded and the outer free end thereof being bent downwardly at substantially a ninety degree angle to form the lip 28 having an outer flat face designed to ride against the face of an object such as a wall, the material being beveled inwardly from the right hand side from a point contiguous to the downturned lip to form the edge 29 leading inwardly at an oblique angle to said lip. When the cutter is moved from left to right along the face of a wall or stone, the lip riding against the same, the grass growing close to or against the wall will be engaged by the end of the lip and then by the beveled edge 29 and moved into the path of the rotary knife to be cut. The notch 29a formed at the junction of the bevel 29 and rounded edge 27 receives the grass directed thereinto by the lip 28 riding along the face of an object.

Instead of the guard and guide secured to the plate 1 a modified form of guard and guide having a segmental body portion 30 may be secured to the bar 19 or to the transport disc with its straight edge portion 31 innermost and its rounded edge 32 substantially flush with the transport disc periphery, a neck portion 33 extending outwardly beyond the knife 5 carries the upstanding lip 34 disposed in advance of the knife and adapted to ride along a wall surface to guide standing grass toward the knife. This type of upstanding lip permits the cutter to be moved either to the right or left along the face of the wall. It serves as a guard also to prevent contact of the rotating blade with the object. The operator with the handle 3 in hand is upon the same side of the plate 1 as the teeth 15 which are, as previously stated, upturned and in the event the operator should accidentally step upon the plate 1 the upturned teeth would receive his foot and hold it above and out of range of the rotating blade thus avoiding the possibility of injury.

What is claimed is:

1. In a grass cutter, a plate, a motor carried thereby, a rotary knife driven by said motor beneath said plate, a transport disc beneath said knife and plate, a guard and guide secured to said plate and having laterally disposed rounded ends, and a lip formed terminally of said guard and guide positioned beyond said rotary knife, said guard and guide being beveled inwardly from said lip into engagement with one of said rounded portions to form a notch to receive material directed thereinto by said lip.

2. In a grass cutter, a plate, a motor carried thereby, a rotary knife beneath said plate fast to the shaft of said motor, a transport disc beneath said knife and plate, a guard and guide secured to said plate, the ends of said guard and guide being rounded, a downturned lip formed terminally of said guard and guide and positioned beyond said rotary knife and having a smooth flat outer face, said guard and guide being beveled inwardly from one end of said lip into engagement with one of said rounded portions to form a notch therewith to receive material directed thereinto by said lip.

JOHN ALEXANDER ORR.